United States Patent [19]

Mintz

[11] Patent Number: 4,570,954
[45] Date of Patent: Feb. 18, 1986

[54] LOAD CARRIER FRAME

[76] Inventor: Daniel Mintz, 70 Cambridge Pl., Brooklyn, N.Y. 11238

[21] Appl. No.: 687,854

[22] Filed: Dec. 31, 1984

[51] Int. Cl.⁴ .............................................. B62B 5/02
[52] U.S. Cl. ................................. 280/5.24; 280/47.27
[58] Field of Search ................. 280/5.24, 5.2, 5.28, 280/5.32, 47.27, 47.28, 32

[56] References Cited

U.S. PATENT DOCUMENTS

| | | | |
|---|---|---|---|
| 3,647,236 | 3/1972 | Hayes | 280/47.27 |
| 4,420,166 | 12/1983 | Law et al. | 280/5.24 |
| 4,504,071 | 3/1983 | Drummond | 280/47.27 |

Primary Examiner—Joseph F. Peters, Jr.
Assistant Examiner—Donn McGiehan
Attorney, Agent, or Firm—Steele, Gould & Fried

[57] ABSTRACT

A load carrier frame is disclosed which includes a spaced pair of fabricated rails. Each rail includes a longitudinal carrier axle track to receive therein the respective ends of a luggage carrier or other wheeled vehicle axle. The track is shaped to elevate the vehicle wheels above the bottom of the fabricated rails to permit sliding the carried load up and down flights of stairs and to lower the vehicle wheels below the bottom of the fabricated rails to permit the vehicle wheels to be utilized to roll the load over longitudinal surfaces with the load carrier frame attached to the wheeled vehicle.

13 Claims, 10 Drawing Figures

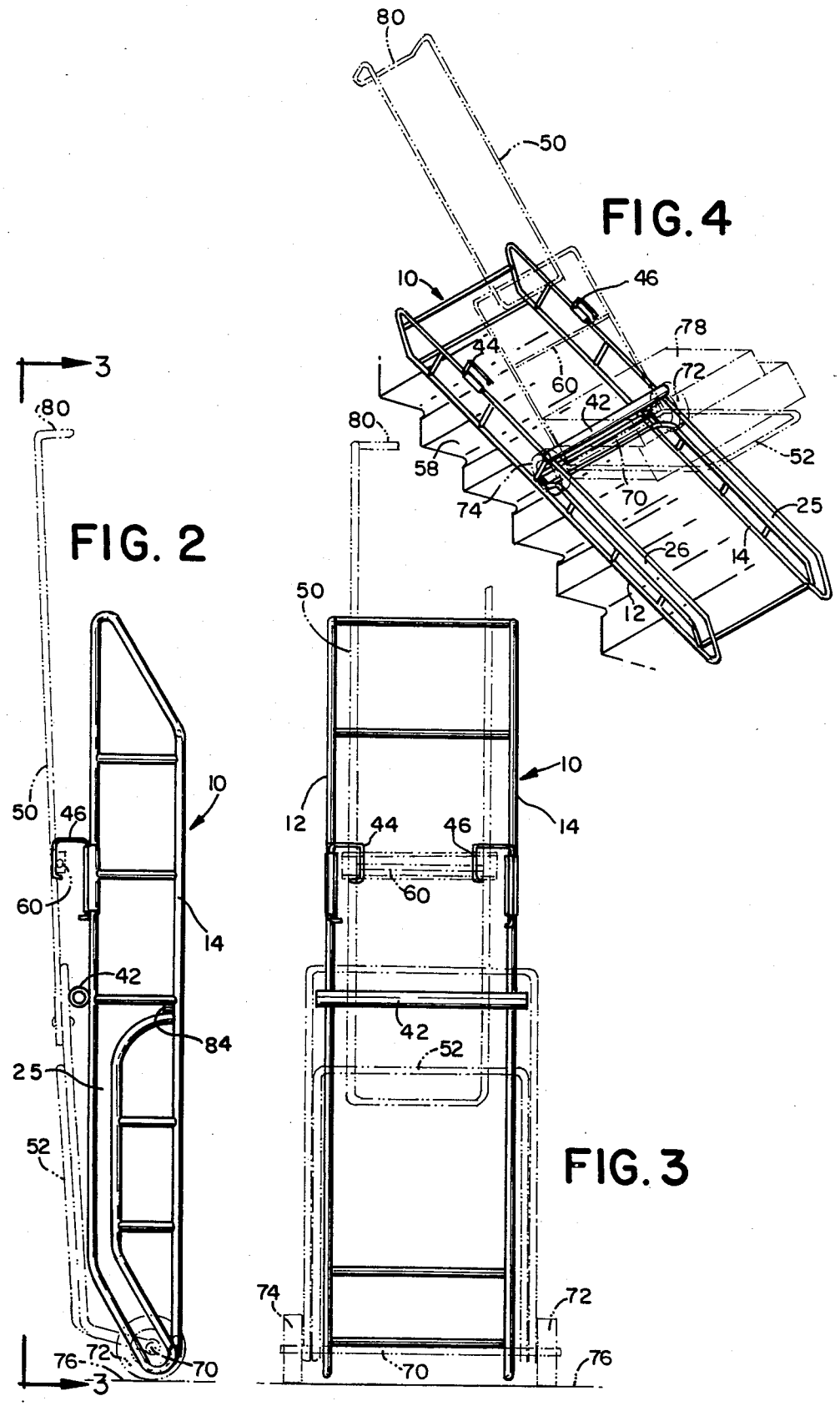

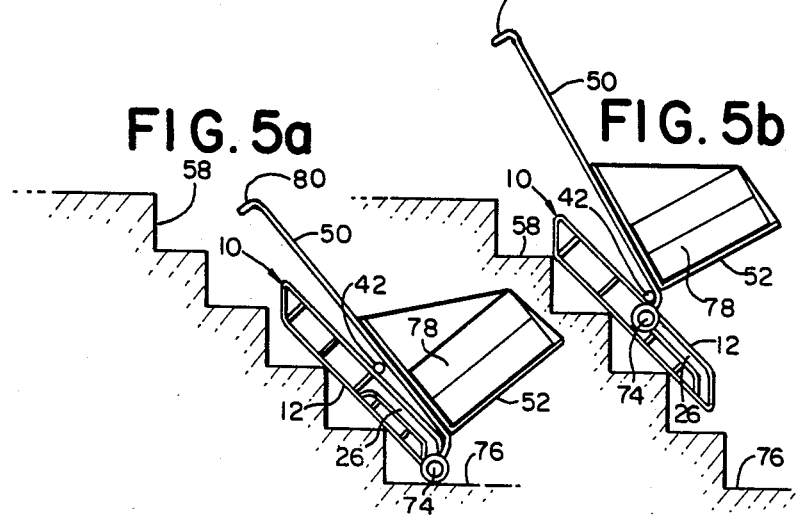
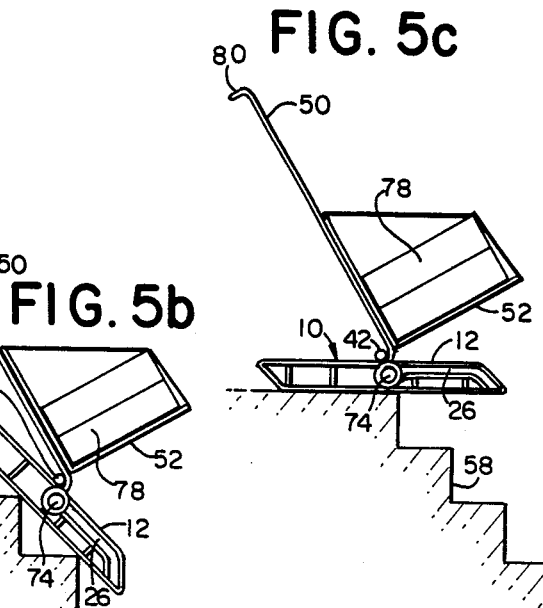
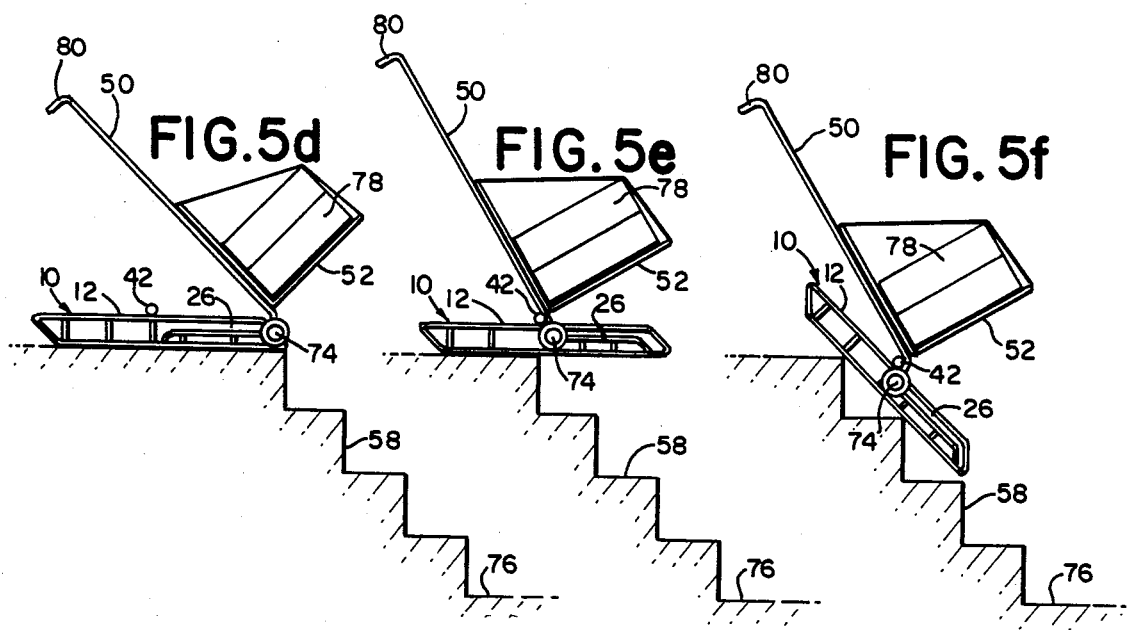

LOAD CARRIER FRAME

BACKGROUND OF THE INVENTION

1. Field of the Invention

This invention relates generally to the field of carrying devices, and more particularly, is directed to a portable carrier frame especially designed to facilitate transporting heavy loads, such as luggage, up and down flights of stairs.

2. Discussion of the Prior Art

In transporting heavy loads, such as boxes, luggage and the like, it is now a common practice to employ lightweight, foldable carriers of the type which comprises generally a telescoping frame and a pair of laterally spaced wheels which are rotatively mounted at the base of the frame. Such carriers have found wide acceptance and popularity for transporting luggage in and about airports and train stations. Conventional hand trucks are also in wide use to move heavy loads over flat surfaces.

In order to prepare for use, the presently available luggage carriers can simply be longitudinally pulled as necessary to telescopingly extend the frame members to provide a convenient carrying device. After the frame has been extended, luggage or other heavy loads may be positioned upon a foldable bottom platform and the entire carrier-luggage combination can then be simply wheeled from location to location. After use, the side rails or frame members can be telescoped into compact arrangement whereby the device will be collapsed into a relatively small, conveniently stored package. The present available hand trucks normally do not have foldable or telescoping components.

While the presently available hand trucks and telescoping type luggage carriers are generally satisfactory in use when wheeling the carried loads over flat surfaces, such as air terminal floor, street surfaces and the like, all such devices of which I am aware suffer from a common deficiency in that they are relatively ineffective to aid in moving the carried load to a different elevation, for example, when transporting the load up and down flights of stairs.

SUMMARY OF THE INVENTION

The present invention relates generally to the field of load carriers, and more particularly, is directed to a novel rigid structure suitable for use with a conventional luggage carrier or other wheeled structure to facilitate the movement of a transported load either up a flight of stairs or down a flight of stairs without separating the load from the carrier.

The structure of the present invention includes a rail-like, light-weight frame which conveniently may be fabricated of steel or aluminum tubing in known manner to provide a lightweight, sturdy and readily transportable load carrier.

The frame of the present invention comprises a pair of laterally spaced, similar, fabricated rails which are identically formed of lightweight, strong, steel or aluminum tubing of suitable strength for the intended service. Each fabricated rail comprises generally a top longitudinal tube member and a bottom longitudinal tube member, the top and bottom tube members being securely joined by a plurality of longitudinally spaced vertical connectors or spacers. The left and right fabricated rails are firmly connected together and fastened by a plurality of longitudinally spaced, transversely oriented horizontal spacers to thereby define a sturdy, unitary structure.

Each of the left and right fabricated rails is provided with a longitudinally extending track defining tube which is longitudinally oriented and so positioned adjacent to the respective left and right top tube members so as to define therebetween respective left and right carrier axle tracks. The left and right tracks receive therewithin in longitudinally adjustable manner the wheel axle of a usual luggage or other type of wheeled carrier or perhaps the axle of a common type of supermarket shopping cart. Each track terminates at its forward end in a forty-five degree angular bottom terminus and at the rearward end in a ninety degree top terminus. When the axle of the luggage carrier or cart is positioned at the bottom of the forward track terminus, the wheels of the carrier or cart extend beyond the structural limits of the carrier frame and can accordingly be utilized to transport the combination of the load carrier, the carrier frame and any carried burden over a flat surface. The luggage carrier axle is movable within the left and right tracks from the bottom terminus of the tracks to the upper or top terminus of the tracks wherein the carrier wheels will be elevated to a position not in contact with the ground. When the luggage carrier wheels are elevated away from contact with the ground, the carrier frame can be advantageously employed to slide the carried load and the luggage carrier either upwardly or downwardly along a flight of steps in a relatively easy manner.

A sturdy stop bar intermediately joins the left and right fabricated fails at the upper terminus of the carrier axle tracks and functions as a positive stop or limit of the longitudinal movement of the load carrier relative to the load carrier frame. Left and right hooks may be conventionally affixed to the left and right rails to facilitate releasably connecting a load carrier with the load carrier frame in a sturdy, yet easily detachable interconnection.

It is therefore an object of the present invention to provide a novel load carrier frame of the type set forth.

It is another object of the present invention to provide a novel load carrier frame suitable for use with a conventional luggage carrier or other wheeled carrier to facilitate movement of the carried load both up and down flights of stairs.

It is another object of the present invention to provide a novel load carrier frame including left and right fabricated rails which are spaced apart a distance substantially equal to the spacing between wheels of a conventional foldable luggage carrier, the left and right fabricated rails being provided with longitudinally extending tracks to receive therein the axle of the luggage carrier, the luggage carrier axle being positioned downwardly within the tracks to allow the carrier wheels to contact a horizontal surface for rolling thereover, the tracks being configured to lift the wheels above the horizontal surface when negotiating stairs to thereby urge the wheels away from contact with the stairs as the load is being transported either up or down a flight of stairs.

It is another object of the present invention to provide a novel method of transporting a carried load up and down a flight of stairs by applying a load carrier frame to a wheeled luggage carrier, engaging the luggage carrier axle within longitudinal tracks in the load carrier with the wheels exposed below the bottom of the frame, wheeling the load to a flight of stairs and then pivoting the luggage carrier relative to the load carrier frame, applying the load carrier frame upon the noses of a plurality of adjacent stair treads, then pulling the luggage carrier upwardly along the tracks while maintaining the carrier frame in stationary position upon the stairs, longitudinally moving the luggage carrier relative to the load carrier frame to elevate the wheels out of contact with the stair treads and then sliding the load carrier frame relative to the stairs with the luggage carrier wheels elevated out of contact with the stairs.

It is another object to provide a novel load carrier frame that is sturdy in construction, inexpensive in manufacture and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 2 is a side elevational view of the load carrier frame of FIG. 1 on reduced scale with a luggage carrier shown attached thereto in phantom lines for purposes of association.

FIG. 3 is a front elevational view looking from line 3—3 on FIG. 2 in the direction of the arrows.

FIG. 4 is a perspective view showing the load carrier frame of the present invention in use to slide a luggage carrier with load attached either up or down a flight of stairs.

FIGS. 5a, 5b, 5c are schematic side elevational views showing the operation of the load carrier frame when transporting a load up a flight of stairs.

FIGS. 5d, 5e, 5f are schematic side elevational views showing the operation of a load carrier frame when transporting a load down a flight of stairs.

DESCRIPTION OF THE PREFERRED EMBODIMENT OF THE INVENTION

Figure 1:
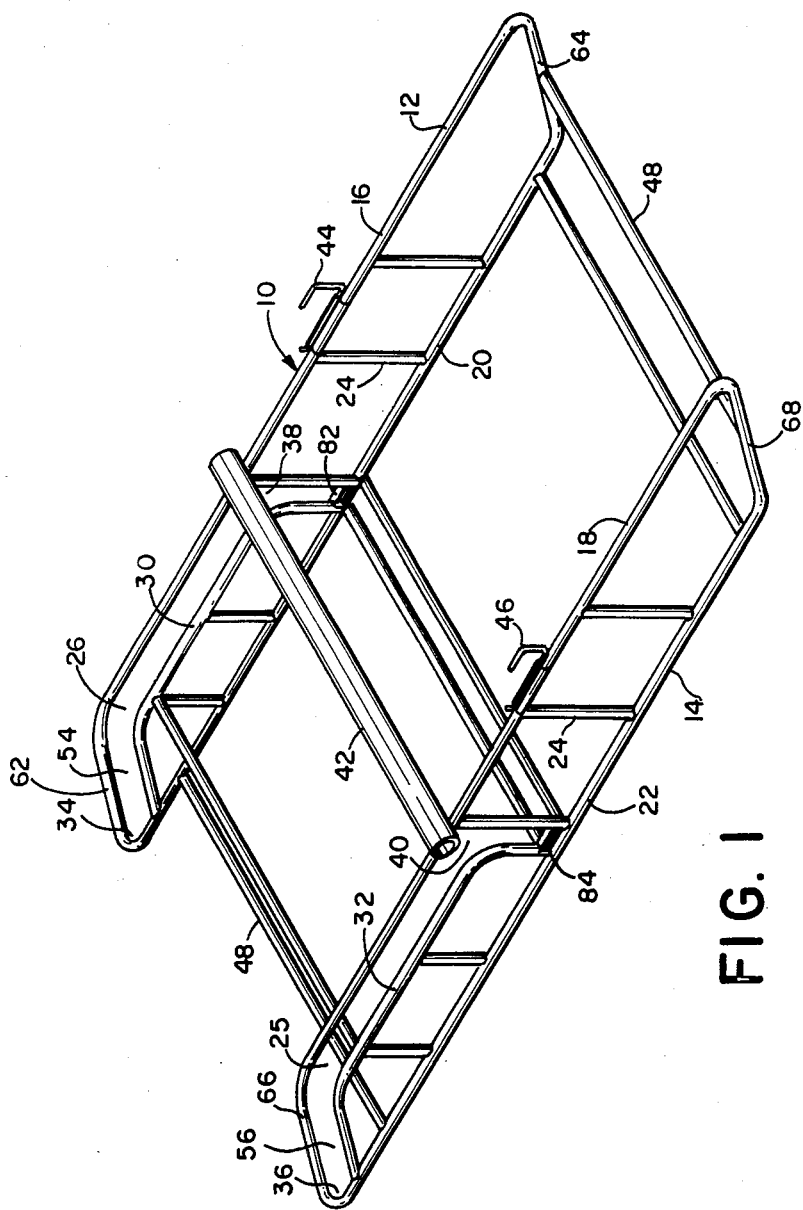
FIG. 1 is a perspective view of a load carrier frame constructed in accordance with the teachings of the present invention.

Although specific terms are used in the following description for the sake of clarity, these terms are intended to refer only to the particular structure of the invention selected for illustration in the drawings, and are not intended to define or limit the scope of the invention.

Referring now to the drawings, there is illustrated in FIG. 1 a load carrier frame 10 which comprises generally a left fabricated rail 12 and a right fabricated rail 14. The left and right fabricated rails 12, 14 are secured together in laterally spaced relationship by a plurality of longitudinally spaced, horizontal or transverse spacers 48.

The left fabricated rail 12 comprises a top left tube member 16 and a bottom left tube member 20 in registry therebelow. The top and bottom left tube members 16, 20 are securely fastened together in spaced relationship by a plurality of longitudinally spaced vertical connectors or spacers 24. Similarly, the right fabricated rail 14 comprises a top longitudinal tube member 18 and a bottom longitudinal tube member 22 in registry therebelow. The top and bottom tube members 18, 22 are affixed and secured in spaced relationship by a plurality of vertical connectors or spacers 24.

In the preferred embodiment, the top and bottom tube members 16, 18 of the left fabricated rail 12 are forwardly or downwardly joined by a front closure tube 62 and are rearwardly or upwardly joined by a rear closure tube 64. Preferably, the left front closure tube 62 is angularly disposed between the upper and lower tube members 16, 20 at an angle of approximately forty-five degrees. Similarly, the top and bottom tube members 18, 22 of the right fabricated rail 14 are joined downwardly or forwardly by a right front closure tube 66 and rearwardly or upwardly by a rear closure tube 68. As illustrated, the right front closure tube 66 is preferably disposed between the right upper and lower tube members 18, 22 at a forty-five degree angle. The various tubes and spacers comprising the left and right fabricated rails are joined together in a sturdy, known type of construction, for example by welding. Alternatively, suitable fittings could be employed at each junction.

Still referring to FIG. 1, right and left carrier axle tracks 25, 26 are respectively longitudinally defined in the right and left fabricated rails 14, 12 by respective right and left track defining tubes 32, 30. The track defining tubes 30, 32 are respectively spaced in registry below a top left tube 16 and top right tube 18 to define the longitudinally extending carrier axle tracks 26, 28. The left track 26 terminates forwardly or downwardly in a bottom terminus 34 and terminates upwardly or rearwardly in a right angular terminus 38. Similarly, the right carrier axle trace 25 terminates forwardly or downwardly in a bottom terminus 36 and terminates rearwardly or upwardly in a top terminus 40.

As hereinafter more fully set forth, when the axle 70 of a usual type of luggage carrier 50 is positioned at the respective bottom termini 34, 36 of the rails 12, 14, the peripheries of the carrier wheels 72, 74 will extend sufficiently beyond the carrier frame 10 to contact a horizontal surface, such as a floor 76, whereby the luggage carrier 50 can be wheeled over the surface 76 in usual, well known manner. Each fabricated rail 12, 14 is provided at the upper track terminus 38, 40 with a top terminus spacer 82, 84 to receive and stop the luggage carrier axle 75 in a position wherein the peripheries of the carrier wheels 72, 74 will be maintained above the bottom of the bottom rail members 20, 22, and this cannot contact the stair treads when in this position.

A sturdy stop bar 42 is medially positioned transversely across the left and right fabricated rails 12, 14 and is respectively secured to the top left tube 16 and top right tube 18 in a sturdy known manner, for example by welding. The bar 42 serves as a positive grasping bar and stop to control movement of the luggage carrier 50 relative to the load carrier frame 10.

Still referring to FIG. 1, left and right carrier engaging hooks 44, 46 are affixed respectively to the left and right longitudinal tube members 16, 18 and extend upwardly or outwardly therefrom to easily releasably engage a transverse bar 60 which is normally provided as part of the luggage carrier 50. It will be appreciated that the luggage carrier 50 is longitudinally movable relative to the carrier frame 10 along the respective left and right carrier axle tracks 26, 28 by pulling the luggage carrier 50 relative to the load carrier frame 10. By longitudinally urging the luggage carrier axle 70 angularly along the upwardly inclined portions 54, 56 of the carrier axle tracks 26, 28, the carrier wheels 72, 74 will be lifted clear of the left and right bottom slides 20, 22. This action thereby lifts out the luggage carrier wheels 72, 74 out of contact with the stationary noses of the stairs 58 to thereby permit useful employment of the carrier frame 12 for moving a load either up or down a flight of stairs 58. It will be appreciated that the load 78, such as one or more pieces of luggage, will always remain affixed upon the luggage carrier base 52 whether the load is being wheeled upon a horizontal surface 76 as illustrated in FIGS. 2 and 3, or when the load 78 is being upwardly or downwardly urged along a flight of stairs 58 as illustrated in FIG. 4.

Referring now to FIGS. 5a, 5b, 5c, 5d, 5e, 5f, the use of the load carrier frame 10 to transport a load 78 and to carry the load either up or down a flight of stairs 58 will now be described.

A conventional telescoping type luggage carrier 50, or other wheeled vehicle, such as a hand truck or a shopping cart, can be associated with the carrier frame 10 by applying the carrier axle 70 within the spaced carrier axle tracks 26, 28. The luggage carrier base 52 can be pivotally extended in usual manner to receive thereon one or more suitcases 78, boxes or other items to be transported. In this configuration, the luggage carrier axle 70 should then be urged downwardly or forwardly within the inclined track portions 54, 56 to the bottom termini 34, 36 thereof whereby the carrier wheels 72, 74 will be in contact with a horizontal surface 76, such as a floor or the ground. The carrier engaging hooks 44, 46 are engaged over a transverse bar 60 of the luggage carrier 50 to thereby maintain the load carrier frame in generally parallel relationship to the luggage carrier 50. With the parts so arranged, the load 78 can be readily wheeled over the horizontal surface 76. See FIGS. 2 and 3.

In order to utilize the carrier frame 10 to move the load 78 up a flight of stairs 58, the user (not shown) will disengage the carrier engaging hooks 44, 46 from the luggage carrier transverse bar 60 so that the luggage carrier 70 is freely pivotal relative to the carrier frame 10 about the luggage carrier axle 70. Then by pulling the luggage carrier handle 80 upwardly while holding the load carrier frame 10 stationary, for example by placing the users' foot against one of the carrier frame transverse spacers 48, the luggage carrier axle 70 will be urged upwardly along the spaced inclined track portions 54, 56 and the remainder of the spaced tracks 26, 28 until the carrier axle drops into the upper right angle slots 38, 40 and stops against the tops of the spacers 82, 84. See FIGS. 5a and 5b. As above set forth, when the wheeled vehicle axle 70 is positioned in the upper slots 38, 40 in bearing engagement on the spacers 82, 84, the wheels 72, 74 will be elevated to a position that is above the left and right bottom tube members 20, 22 and thus clear of the stairs 58.

Once the carrier is in the position illustrated in FIG. 5b, the user can then simply walk up the stairs 58 pulling the luggage carrier handle 80 as he goes. The bottom left and right tube members or frame slides 20, 22 will contact directly and slide upwardly along the respective noses of the stair treads to thereby provide a smooth inclined path for moving the load 78 up the stairs 58. At the top landing, as shown in FIG. 5c, the carrier frame will be in horizontal alignment with the landing and the load and the luggage carrier frame can then be adjusted relative to the load carrier frame 10 as required to roll the load over the upper horizontal surface in the usual manner.

When the user wishes to negotiate the load 78 down a flight of stairs 58, the load carrier frame 10 is horizontally positioned as in FIG. 5d and the luggage carrier axle 70 is urged into the medial slots 38, 40 as shown in FIG. 5e. The carrier frame 10 with the luggage carrier 50 medially positioned thereon can then be slidingly urged down the stairs by pulling rearwardly on the luggage carrier handle 80 with sufficient force to permit controlled downward, sliding movement of the carrier frame 10 over the flight of stairs. See FIG. 5f. When the bottom termini 34, 36 of the load carrier frame 10 contact the horizontal surface 76 at the bottom of the stairs 58, the luggage carrier axle 70 can then be urged out of the upper slots 38, 40, downwardly along the left and right carrier axle tracks 26, 28, downwardly along the track inclined portions 54, 56 until the carrier wheels 72, 74 are again in position to contact the horizontal surface 76. In this position, the load carrier frame 10 can then be pivoted relative to the luggage carrier 50 and the spaced hooks 44, 46 can be reengaged over the luggage carrier transverse bar 60 to again place the parts in parallel arrangement for movement over the horizontal floor 76.

Although the invention has been described with a certain degree of particularity, it is understood that the present disclosure has been made only by way of example and that numerous changes in the details of construction and the combination and arrangement of parts may be resorted to without departing from the spirit and scope of the invention. Thus, the scope of the invention should not be limited by the foregoing specification, but rather, only by the scope of the claims appended hereto.

What is claimed is:

1. A load carrier frame for moving a vehicle having an axle and wheels over a surface and up and down a flight of stairs comprising
    a left rail and a right rail, the left and right rails being interconnected by a plurality of transverse spacers,
        each rail comprising a bottom terminus, a top terminus, a bottom slide for slidingly contacting the stairs, and a vehicle axle track above a bottom slide,
        the axle tracks being at least partly non-linear in configuration, the axle tracks beginning at a bottom terminus and ending medially of the left and right rails,
        the axle tracks being adapted to permit movement of a wheeled vehicle relative to the load carrier frame by retaining portions of the vehicle axle therein in movable engagement.

2. The frame of claim 1 wherein an axle track comprises a bottom positioned inclined portion and a longitudinally extending portion in communication with the inclined portion.

3. The frame of claim 2 wherein the axle track comprises a medially positioned top terminus, the longitudinally extending portion being in communication with and terminating at the top terminus.

4. The frame of claim 3 wherein the top terminus comprises a top section that is oriented at approximately ninety degrees from a bottom slide.

5. The frame of claim 4 wherein the longitudinally extending portion of the axle track is spaced from the bottom slide by a distance sufficient to elevate the vehicle wheels above the surface when the vehicle axle is positioned in the said longitudinally extending portion.

6. The frame of claim 4 and a spacer in the said top section in contact with the bottom slide, the spacer extending in height through a distance that is sufficient to elevate the vehicle wheels above the surface when the vehicle axle is positioned in the top section.

7. The method of transporting a load carried in a vehicle having an axle and wheels rotatable about the axle upon a flight of stairs comprising the steps of
applying a load carrier frame having a bottom, a top and a longitudinal track to the vehicle by placing the vehicle axle within the longitudinal track;
shifting the axle within the longitudinal track and elevating the wheels above the bottom of the load carrier frame;
placing the bottom of the load carrier frame in contact with the stairs; and
moving the vehicle relative to the stairs and sliding the load carrier frame bottom over the stairs.

8. The method of claim 7 and the additional step pivoting the vehicle relative to the load carrier frame when sliding the frame over the stairs.

9. The method of claim 8 and locating the axle medially of the load carrier frame when moving the vehicle relative to the stairs.

10. The method of claim 9 wherein the longitudinal track has a forward terminus and a rearward terminus and wherein the location comprises shifting the axle to the rearward terminus of the track.

11. The method of claim 10 and the additional step of shifting the axle to the forward terminus of the track after sliding the frame over the stairs.

12. The method of claim 11 and lowering the wheels below the bottom of the load carrier frame while shifting the axle to the lower terminus of the track.

13. The method of claim 12 and the additional step of pivoting the vehicle relative to the load carrier frame and securing the vehicle to the frame in generally parallel alignment.

* * * * *